United States Patent [19]

Bower et al.

[11] Patent Number: 4,599,388

[45] Date of Patent: Jul. 8, 1986

[54] PROCESS FOR MODIFYING POLYBENZIMIDAZOLE POLYMERS WITH ETHYLENE CARBONATES

[75] Inventors: Esther A. Bower, Flemington; Joseph J. Rafalko, Chatham Township, Morris County, both of N.J.

[73] Assignee: Celanese Corporation, New York, N.Y.

[21] Appl. No.: 691,962

[22] Filed: Jan. 16, 1985

[51] Int. Cl.$^4$ .................. C08G 69/26; C08G 69/28; C08G 73/18; C08L 69/00

[52] U.S. Cl. ..................... 525/433; 528/341; 528/342; 528/361

[58] Field of Search .............. 525/433; 528/341, 342, 528/361

[56] References Cited

U.S. PATENT DOCUMENTS

| | | | |
|---|---|---|---|
| Re. 26,065 | 7/1966 | Marvel et al. | 528/342 |
| 3,174,947 | 3/1965 | Marvel et al. | 528/342 |
| 3,313,783 | 4/1967 | Iwakura et al. | 528/342 |
| 3,433,772 | 3/1969 | Chenevey et al. | 528/341 |
| 3,509,108 | 4/1970 | Prince | 528/341 |
| 3,758,644 | 5/1971 | Trischler | 524/233 |
| 4,020,142 | 4/1977 | Davis et al. | 525/433 |
| 4,086,295 | 4/1978 | Mori et al. | 525/433 |
| 4,101,532 | 7/1978 | Ruoti et al. | 525/433 |
| 4,154,919 | 5/1979 | Sheratte | 528/342 |
| 4,312,976 | 1/1982 | Choe | 528/342 |

FOREIGN PATENT DOCUMENTS 2511483 9/1976 Fed. Rep. of Germany ...... 525/433

*Primary Examiner*—Herbert J. Lilling
*Attorney, Agent, or Firm*—Depaoli & O'Brien

[57] ABSTRACT

This invention provides a process for modifying a polybenzimidazole polymer which involves employing ethylene carbonate as a hydroxyethylating agent to introduce 2-hydroxyethyl substituents at active imidazole hydrogen sites in the polymer. The polymer product exhibits improved hydrophilicity.

11 Claims, No Drawings

PROCESS FOR MODIFYING POLYBENZIMIDAZOLE POLYMERS WITH ETHYLENE CARBONATES

BACKGROUND OF THE INVENTION

Typical processes for preparing polybenzimidazoles are described in Journal of Polymer Science, 50, 511 (1961), and in various United States patents.

U.S. Pat. No. 3,174,947 (U.S. Pat. No. Re. 26,065) describes a method of preparing high molecular weight aromatic polybenzimidazoles by melt polymerizing an aromatic tetraamine and a diphenyl ester or an anhydride of an aromatic dicarboxylic acid at an elevated temperature and thereafter further polymerizing the product of the melt polymerization in the solid state. According to this process, in order to produce polymers of sufficiently high molecular weight to be suitable for practical use it is necessary to pulverize the product of the melt polymerization prior to polymerization in the solid state and to conduct the solid state polymerization at an elevated temperature under a reduced pressure of less than 0.5 mm Hg or at an elevated temperature and in an inert gas stream over a prolonged period of time.

U.S. Pat. No. 3,313,783 describes a process which involves the solution polymerization of an inorganic acid salt of an aromatic tetraamine and a dicarboxylic acid or a derivative thereof with heat in polyphosphoric acid.

Another process for producing polybenzimidazoles is described in U.S. Pat. No. 3,509,108. In the process the monomers are initially reacted in a melt phase polymerization at a temperature above 200° C. and a pressure above 50 psi. The reaction product is then heated in a solid state polymerization at a temperature above 300° C. to yield the final aromatic polybenzimidazole product. The process requires that the initial reaction be conducted at a pressure above 50 psi (preferably, between 300-600 psi) in order to control the foaming encountered during the polymerization.

U.S. Pat. No. 3,555,389 describes a two-stage process for the production of aromatic polybenzimidazoles. The monomers are heated at a temperature above 170° C. in a first stage melt polymerization zone until a foamed prepolymer is formed. The foamed prepolymer is cooled, pulverized, and introduced into a second stage polymerization zone where it is heated in the presence of phenol to yield a polybenzimidazole polymer product.

U.S. Pat. No. 3,433,772 describes a two stage polymerization process for the production of aromatic polybenzimidazoles which utilize an organic additive, such as an alkane having 11-18 carbon atoms or a polycarbocyclic hydrocarbon, in order to control foaming during the first stage.

Other United States patents relating to one-stage and two-stage production of polybenzimidazoles include U.S. Pat. Nos. 3,408,336; 3,549,603; 3,708,439; 4,154,919; and 4,312,976; all patents enumerated herein incorporated by reference.

Polybenzimidazole polymers are valuable for the production of high temperature stable molded and extruded products such as films and fibers.

Polybenzimidazole polymers are hydrophobic in nature. For this reason polybenzimidazole powders or shaped articles cannot be wet with a hydrophilic solvent. The hydrophobic character of polybenzimidazole polymers limits the utility of these resins for applications such as wet films and the like.

U.S. Pat. No. 3,578,644 describes the preparation of hydroxyl modified polybenzimidazoles by reacting a polybenzimidazole polymer with an omega-haloalkanol or a 1,2-alkylene oxide in the presence of a basic catalyst such as sodium hydride.

The polymers produced correspond to the formula:

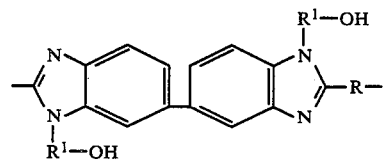

where R is a divalent aliphatic, alicyclic or aromatic group, and $R^1$ is a divalent aliphatic group. The use of a haloalkanol reactant requires a basic catalyst, and an inorganic salt is formed as a byproduct. The use of a gaseous alkylene oxide reactant requires a pressure vessel for the reaction medium.

There is continuing interest in the development of new and improved processes for the modification of polybenzimidazole polymers.

Accordingly, it is an object of this invention to provide a process for modifying polybenzimidazole polymers.

It is another object of this invention to provide an improved process for increasing the hydrophilicity of polybenzimidazole polymers.

It is a further object of this invention to provide novel 2-hydroxyethylated polybenzimidazole polymers.

Other objects and advantages of the present invention shall become apparent from the accompanying description and disclosure.

DESCRIPTION OF THE INVENTION

One or more objects of the present invention are accomplished by the provision of a process for modifying a polybenzimidazole polymer which comprises reacting ethylene carbonate with a polybenzimidazole polymer in an organic solvent medium to produce a hydroxyethylated polybenzimidazole product.

The term "ethylene carbonate" as employed herein is meant to include lower alkyl-substituted cyclic carbonate compounds such as propylene carbonate or butylene carbonate.

The ethylene carbonate reactant can be employed essentially in any molar quantity with respect to the polybenzimidazole starting material, and preferably is employed in at least a stoichiometric quantity with respect to the reactive imidazole hydrogen sites in the polymer. It is desirable to achieve at least about 10 percent substitution of the reactive imidazole hydrogen sites with a 2-hydroxyethyl group.

The hydroxyethylation reaction between the ethylene carbonate and polybenzimidazole typically is conducted at a temperature between about 30°–200° C. for a reaction period between about 0.5–5 hours. The reaction can be accomplished conveniently at ambient pressures.

The concentration of the polybenzimidazole and ethylene carbonate reactants in the organic solvent reaction medium is limited by the solubility of the polybenzimidazole in the solvent. Generally the polybenzimidazole concentration in the organic solvent medium will be in the range between about 1–30 weight percent, based on the total weight of the reaction medium. The molecular weight of the polybenzimidazole is a factor in determining the maximum solute weight of the polymer in the organic solvent reaction medium.

Organic solvents suitable for purposes of the present invention include N,N-dimethylformamide, N,N-dimethylacetamide, dimethylsulfoxide, N-methyl-2-pyrrolidone, and the like.

The polybenzimidazole starting materials are a known class of heterocyclic polymers which are characterized by a recurring monomer unit which corresponds to the following Formula I or II. Formula I is:

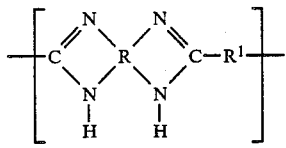

where R is a tetravalent aromatic nucleus with the nitrogen atoms forming the benzimidazole rings being paired upon adjacent carbon atoms, i.e., ortho carbon atoms, of the aromatic nucleus, and $R^1$ is a divalent substituent selected from aliphatic, alicyclic and aromatic radicals. Illustrative of R' substituents are divalent organic radicals containing between about 2–20 carbon atoms, such as ethylene, propylene, butylene, cyclohexylene, phenylene, pyridine, pyrazine, furan, thiophene, pyran, and the like.

Formula II corresponds to the structure:

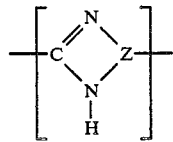

where Z is an aromatic nucleus having the nitrogen atoms forming the benzimidazole ring paired upon adjacent carbon atoms of the aromatic nucleus.

The above illustrated polybenzimidazoles can be prepared by various known processes, as described in the Background Of The Invention section.

The following generalized equation illustrates the condensation reaction which occurs in forming the polybenzimidazoles having the recurring units of Formula I:

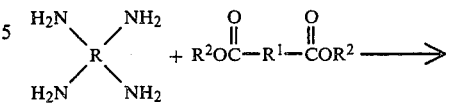

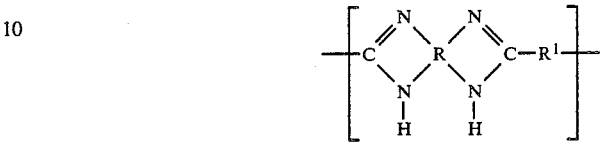

Such polybenzimidazoles are produced by the reaction of a mixture of (1) at least one aromatic tetraamine containing two groups of amine substituents, the amine substituents in each group being in an ortho position relative to each other, and (2) at least one dicarboxylate ester in which $R^1$ and $R^2$ in the compound shown are substituents selected from aliphatic, alicyclic and aromatic groups.

Examples of polybenzimidazoles which have the recurring structure of Formula I include:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6'-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2"-(m-phenylene)-5'-5"-di(benzimidazole)-propane-2,2; and
poly-2,2'-(m-phenylene)-5',5"-di(benzimidazole)-ethylene-1,2.

The preferred polybenzimidazole of Formula I is poly-2,2'-(m-phenylene)-5,5'-bibenzimidazole as characterized by the recurring monomeric unit:

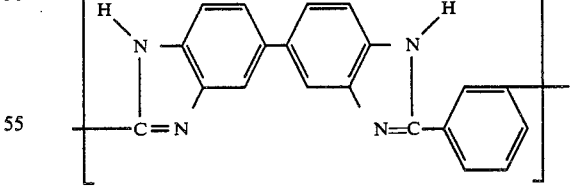

The illustrated polymer can be prepared by the reaction of 3,3'-4,4'-tetraaminobiphenyl with diphenyl isophthalate.

The polybenzimidazoles having the recurring monomer unit of Formula II can be prepared by the autocondensation of at least one aromatic compound having a pair of amine substituents in an ortho position relative to each other and a carboxylate ester group positioned upon an aromatic nucleus. Examples of such compounds are esters of diaminocarboxylic acids which include 3,4-diaminobenzoic acid; 5,6-diaminonaphthalene-1-carboxylic acids which include 3,4-diaminobenzoic acid; 5,6-diaminonaphthalene-1-carboxylic acid; 5,6-diamino-naphthalene-2-carboxylic acid; 6,7-diaminonaphthalene-1-carboxylic acid; 6,7-diaminonaphthalene-2-carboxylic acid, and the like. A preferred compound is 4-phenoxycarbonyl-3',4'-diaminodiphenyl ether:

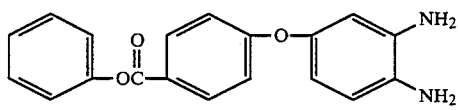

The polymer obtained with 4-phenoxycarbonyl-3',4'-diaminodiphenyl ether is poly-5-(4-phenyleneoxy)benzimidazole.

A polybenzimidazole starting material for the present invention process typically will exhibit an inherent viscosity between about 0.1–1.0 dl/g when measured at a concentration of 0.4 g of said polybenzimidazole in 100 ml of 97 percent sulfuric acid at 25° C.

The weight average molecular weight of a typical polybenzimidazole starting material will be in the range between about 1000–100,000.

The products of the present process are hydroxyethylated polyimidazoles of increased hydrophilicity:

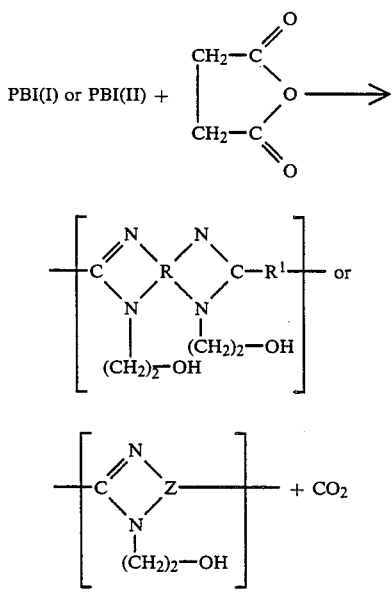

The (I) and (II) repeating units correspond to the Formula I and Formula II structures as previously defined.

When at least stoichiometric quantities of ethylene carbonate and polybenzimidazole reactants are employed, the 2-hydroxyethyl substitution of reactive imidazole hydrogen sites will vary in the range between about 40–100 percent of the said hydrogen sites. The hydrophilicity of a 2-hydroxyethylated polybenzimidazole product increases as the 2-hydroxyethyl content of the product increases.

After an invention process reaction is completed, the hydroxyethylated polybenzimidazole can be recovered by conventional procedures, such as by vacuum distillation of the solvent medium to provide a residual polymeric solid, or by precipitation of the polymer from the solvent medium by addition of a non-solvent such as methanol or hexane.

With respect to the mechanism of the invention process hydroxyethylation reaction, the ability of ethylene carbonate to react efficiently as a hydroxyethylating agent under the process conditions is unexpected.

U.S. Pats. Nos. 3,248,414 and 3,248,416 describe the preparation of high molecular weight polycarbonates from ethylene carbonate and an active hydrogen compound employing a basic catalyst and a temperature above 100° C. The ethylene carbonate does not function as a hydroxyethylating agent in the patent processes.

The hydroxyethylated polybenzimidazole products of the present invention can be cast molded or extruded into shaped articles in the manner of prior art polybenzimidazole polymers. A present invention hydroxyethylated polybenzimidazole has improved hydrophilicity which is a valuable property for the production of polybenzimidazole reverse osmosis membranes with a high flux capacity.

The following examples are further illustrative of the present invention. The components and specific ingredients are presented as being typical, and various modifications can be derived in view of the foregoing disclosure within the scope of the invention.

EXAMPLE I

This Example illustrates the preparation of a polybenzimidazole starting material for the invention process.

Into a three-necked flask equipped with a nitrogen inlet and outlet, mechanical stirrer and a condenser are placed 23.333 g (0.1089 moles) of 3,3',4,4'-tetraaminobiphenyl, 34.67 g (0.1089 moles) of diphenylisophthalate and 0.3 g of diphenylphosphinic acid. The flask is degassed and then filled with nitrogen. The degassing is repeated at least three times. The mixture is heated rapidly with stirring to 225° C. The stirring is stopped. The temperature of the reaction mixture is then raised to 270° C. and held at that temperature for 1.5 hours. The resulting product is cooled to room temperature and then is ground.

The ground prepolymer is placed in a flask and after the degassing step is repeated the prepolymer is heated at 360° C. for one hour. The resulting polybenzimidazole exhibits a weight average molecular weight of 201,700 with a molecular weight distribution of 2.91 and an inherent viscosity of 1.00 dl/g when measured in a concentration of 0.4 g of the polybenzimidazole in 100 ml of 97% sulfuric acid.

A polybenzimidazole polymer as prepared above is further characterized by a Plugging Value of greater than about 0.5, and a Gardner color of less than about 10.

EXAMPLE II

This Example illustrates the preparation of a hydroxyethylated polybenzimidazole in accordance with the present invention process.

A 1.31 g quantity of fiber grade poly-2,2'-(m-phenylene)-5,5'-bibenzimidazole (IV of 0.73 dl/g) containing 4.7 weight percent lithium chloride is added to 100 ml of 99 mole percent dimethylformamide in a 3-neck 500 ml round bottom flask fitted with a reflux condenser and inlet and outlet gas lines. After the polymer is dissolved, 3.72 g of 98 percent ethylene carbonate is added. The solution is refluxed with stirring under nitrogen for 5 hours.

After cooling, the modified polymer is precipitated with methanol. The solids are separated by vacuum filtration, and then are dried overnight in a vacuum oven at 120° C. To remove residual dimethylformamide, the solids are soaked in methanol for 8 hours and then dried in a vacuum oven. A yield of 0.98 g of hydroxyethylated polybenzimidazole is recovered, and has a 60–70 percent degree of hydroxyethyl substitution of the original reactive imidazole nitrogen sites.

EXAMPLE III

This Example illustrates the preparation of hydroxyethylated polybenzimidazoles in accordance with the present invention process.

A mixture of 72 g of poly-2,2'-(m-phenylene)-5,5'-bibenzimidazole powder, 10 g lithium chloride and 318 g of dimethylacetamide are heated at 240° C. for 2 hours in a high pressure reactor which is rotated while heating. At the end of the heating period, the reactor and its contents are cooled to room temperature. The resultant viscous brown liquid reaction medium is vacuum filtered to remove any insoluble material.

The recovered reaction medium (111.6 g) is charged to a 500 ml, 3-neck, round bottom distilling flask fitted with a mechanical stirrer, nitrogen purge inlet and a water-cooled reflux condenser. Ethylene carbonate (11.86 g) is added, and the reaction medium is stirred under a nitrogen atmosphere and gradually heated until the solvent begins to reflux. Refluxing is maintained for 5 hours, and then the reaction medium is cooled to room temperature with stirring.

The hydroxyethylated polybenzimidazole product is recovered in the same manner as in Example II.

If the starting polymer is poly-5-(4-phenyleneoxy)-benzimidazole, the resultant product of the process is hydroxyethylated poly-5-(4-phenyleneoxy)benzimidazole, which has an 80–90 percent degree of hydroxyethyl substitution.

What is claimed is:

1. A process for modifying a polybenzimidazole polymer which comprises reacting ethylene carbonate with a polybenzimidazole polymer in an organic solvent medium to produce a hydroxyethylated polybenzimidazole product.

2. A process in accordance with claim 1 wherein the ethylene carbonate is employed in at least a stoichiometric quantity with respect to the reactive imidazole hydrogen sites.

3. A process in accordance with claim 1 wherein the reaction is conducted at a temperature between about 30°–200°C. for a reaction period between about 0.5–5 hours.

4. A process in accordance with claim 1 wherein the polybenzimidazole product has at least about 10 percent of the reactive imidazole hydrogen sites substituted with a 2-hydroxyethyl group.

5. A process for increasing the hydrophilicity of a polybenzimidazole polymer which comprises reacting ethylene carbonate in an organic solvent medium with a polybenzimidazole polymer characterized by the recurring monomeric unit:

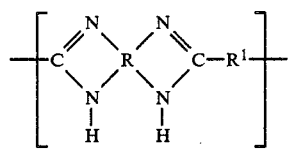

where R is a tetravalent aromatic nucleus with the nitrogen atoms forming the benzimidazole rings being paired upon adjacent carbon atoms, and $R^1$ is a divalent substituent selected from aliphatic, alicyclic and aromatic radicals containing between about 2–20 carbon atoms, to produce a hydroxyethylated polybenzimidazole product.

6. A process in accordance with claim 5 wherein the polybenzimidazole starting material exhibits an inherent viscosity between about 0.1–1.0 dl/g when measured at a concentration of 0.4 g of said polybenzimidazole in 100 ml of 97 percent sulfuric acid at 25° C.

7. A process in accordance with claim 5 wherein the polybenzimidazole starting material is poly-2,2'-(m-phenylene)-5,5'-bibenzimidazole.

8. A process in accordance with claim 5 wherein the polybenzimidazole product has at least about 10 percent of the reactive imidazole hydrogen sites substituted with a 2-hydroxyethyl group.

9. A process for increasing the hydrophilicity of a polybenzimidazole polymer which comprises reacting ethylene carbonate in an organic solvent medium with a polybenzimidazole polymer characterized by the recurring monomeric unit:

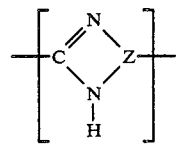

where Z is an aromatic nucleus having the nitrogen atoms forming the benzimidazole ring paired upon adjacent carbon atoms of the aromatic nucleus, to produce a hydroxyethylated polybenzimidazole product.

10. A process in accordance with claim 9 wherein the polybenzimidazole reactant is poly-5-(4-phenyleneoxy)-benzimidazole.

11. Hydroxyethylated poly-5-(4-phenyleneoxy)-benzimidazole produced in accordance with the process of claim 10.

* * * * *